United States Patent
Mehas et al.

(10) Patent No.: US 7,034,586 B2
(45) Date of Patent: Apr. 25, 2006

(54) STARTUP CIRCUIT FOR CONVERTER WITH PRE-BIASED LOAD

(75) Inventors: Gustavo J. Mehas, Mercer Island, WA (US); James W. Leith, Seattle, WA (US); Brandon D. Day, Seattle, WA (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 10/865,373

(22) Filed: Jun. 10, 2004

(65) Prior Publication Data

US 2005/0194951 A1    Sep. 8, 2005

Related U.S. Application Data

(60) Provisional application No. 60/550,292, filed on Mar. 5, 2004.

(51) Int. Cl.
*H03L 7/00* (2006.01)

(52) U.S. Cl. ........................... 327/143; 323/901
(58) Field of Classification Search ............... 327/143, 327/540, 541; 323/901
See application file for complete search history.

(56) References Cited

U.S. PATENT DOCUMENTS 5,289,097 A * 2/1994 Erickson et al. ............ 318/561

* cited by examiner

*Primary Examiner*—Shawn Riley
(74) *Attorney, Agent, or Firm*—Gary R. Stanford

(57) ABSTRACT

A method of starting a DC—DC converter into a precharged output voltage including generating a reference voltage having a linear relationship with the output voltage such that the reference voltage ranges between a minimum and maximum voltage level of a PWM triangular waveform as the output voltage ranges between zero and an input voltage level, and enabling output switching of the DC—DC converter when the reference voltage is approximately equal to a compensation signal generated by an error amplifier comparing the reference voltage with a feedback signal representative of the output voltage. Generating a reference voltage may include applying a first current based on the input voltage through two resistors to develop the minimum and maximum voltage levels, applying the first current in one direction through a third resistor, and applying a second current based on the output voltage through the third resistor in the opposite direction.

18 Claims, 3 Drawing Sheets

US 7,034,586 B2

STARTUP CIRCUIT FOR CONVERTER WITH PRE-BIASED LOAD

CROSS-REFERENCE TO RELATED APPLICATIONS

This application is based on U.S. Provisional Patent Application Ser. No. 60/550,292, filed on Mar. 5, 2004, which is herein incorporated by reference for all intents and purposes.

This application is related to the following co-pending U.S. patent applications, which have a common assignee and at least one common inventor, and which are herein incorporated by reference in its entirety for all intents and purposes:

| Ser. No. | DOCKET NUMBER | TITLE |
| --- | --- | --- |
| 10/775,560 | INSL.0090 | STARTUP CIRCUIT FOR A DC—DC CONVERTER |

BACKGROUND OF THE INVENTION

1. Field of the Invention

The present invention relates to PWM power regulators and/or DC—DC converters, and more particularly to a PWM switching DC—DC converter methodology for startup into a pre-charged or pre-biased load.

2. Description of the Related Art

The typical startup sequence of a pulse-width modulation (PWM) DC—DC converter is to ramp the non-inverting or positive "+" input of a feedback control error amplifier from zero (0) Volts (V) to a target VREF setpoint voltage level. The error amplifier is part of a feedback control loop which regulates an output voltage VOUT by comparing the reference voltage, VREF, with a feedback signal based on a sensed portion of VOUT. In an exemplary buck-type converter, the PWM control circuitry provides a PWM signal which controls a gate driver, which further controls a switching device pair to convert an input voltage to the regulated output voltage. The switching device pair includes an upper switching device and a lower switching device, which are typically implemented as a MOSFET pair.

If the converter is started into a pre-baised load, such as when VOUT is already charged, there can be large potentially damaging tranisient currents because VREF is less than the feedback signal. In particular, since the feedback loop attempts to regulate VOUT by comparing the voltage level of the feedback signal based on VOUT with VREF at the input of the error amplifier, where the feedback signal is already high and VREF is ramping up at startup, the control circuit attempts to pull VOUT lower by turning on the "pull down" output switching device (e.g., the lower device of switching device pair). In this situation, the lower device can be turned on long enough to exceed its thermal limit. The surge currents can cause significant stress to on-chip components possibly resulting in catastrophic failure. In addition, these surge currents cause "non-monotinicities" or variations in the output voltage which in some cases can cause downstream integrated circuits (ICs) to latch up and fail.

It is desired to prevent the lower switching device from remaining on too long and to prevent undesirable variations in the output voltage particularly at startup.

SUMMARY OF THE INVENTION

A startup circuit according to an exemplary embodiment of the present invention for a DC—DC power converter includes first and second circuits and a comparator. The DC—DC power converter includes an error amplifier which provides a compensation signal to a pulse width modulation (PWM) circuit that uses the compensation signal and a triangular PWM waveform to develop a PWM signal to control a switching circuit which converts an input voltage to an output voltage relative to a common power reference voltage. The switching circuit includes an enable input such that the output of the DC—DC power converter is enabled by the startup circuit.

The first circuit establishes a minimum peak voltage and a maximum peak voltage for the triangular PWM waveform. The second circuit establishes a reference voltage having a linear relationship with the output voltage. In particular, the reference voltage ranges from the minimum to maximum peak voltages while the output voltage ranges from the common power reference voltage to the level of the input voltage. The comparator has a first input for receiving the compensation signal, a second input receiving the reference voltage, and an output providing the enable signal to the enable input of the switching circuit.

In one embodiment, the second circuit includes a bias circuit providing a bias node, a reference resistor, first and second current generators and first and second current mirror circuits. The reference resistor is coupled between the bias node and a reference node that develops the reference voltage. The first current generator develops a first current that is proportional to the input voltage. The second current generator develops a second current that is proportional to the output voltage. The first current mirror circuit applies the first current through the reference resistor from the bias node to the reference node. The second current mirror circuit applies the second current through the reference resistor from the reference node to the bias node. The first and second current generators and the reference resistor are configured such that the reference voltage is approximately equal to the minimum peak voltage if the output voltage is at the common power reference voltage and is approximately equal to the maximum peak voltage if the output voltage is at the level of the input voltage.

In a more particular embodiment, the startup circuit includes first and second resistors and a third current mirror. The first and second resistors each have approximately the same resistance as the reference resistor and both are coupled to the bias node. The third current mirror circuit applies the first current into the first resistor and draws the first current from the second resistor so that the first resistor develops the maximum peak voltage and the second resistor develops the minimum peak voltage. Further, the second current generator may be configured to generate the second current at twice the current level of the first current if the output voltage is approximately equal to the input voltage.

The startup circuit may further include a first voltage divider that divides the input voltage to provide an input sense voltage and a second voltage divider that divides the output voltage to provide an output sense voltage. In this case, the first current generator may include a first transconductance amplifier having an input receiving the input sense voltage and an output that generates the first current across a third resistor to maintain its voltage at approximately the same voltage level as the input sense voltage. The second current generator includes a second transconductance amplifier having an input receiving the output sense voltage and an output that generates the second current across a fourth resistor to maintain its voltage at approximately the same voltage level as the output sense voltage, where the third resistor has approximately twice the resistance of the fourth resistor.

The DC—DC power converter includes an output inductor which is typically coupled between an output node that develops the output voltage and to an intermediate phase node of the switching circuit. In one embodiment, the second current generator senses the output voltage via the phase node.

In an alternative embodiment, the second circuit includes first and second resistors, two amplifiers including a buffer amplifier, and first and second current devices. The first resistor has a first end for receiving the input voltage and a second end. The second resistor has a first end for receiving the output voltage, a second end that develops the reference voltage, and a resistance approximately equal to the first resistor. The first amplifier has an inverting input receiving the maximum peak voltage, a non-inverting input coupled to the second end of the first resistor and an output. The buffer amplifier maintains its output at the minimum peak voltage. The first current device has a current path coupled between the second end of the first resistor and the output of the buffer amplifier and has a control input coupled to the output of the first amplifier. The second current device is configured substantially similar to the first current device, and has a current path coupled between the second end of the second resistor and the output of the buffer amplifier and has a control input coupled to the output of the first amplifier. In this case, the first amplifier controls the first current device to maintain voltage at the second end of the first resistor approximately equal to the maximum peak voltage. Thus, the current paths of the devices develop approximately the same resistance to equally divide the input and output voltages.

A DC—DC converter according to another embodiment of the present invention includes an output switching circuit, an error amplifier, PWM logic, and a startup circuit. The output switching circuit has an enable input for receiving an enable signal, such that, when enabled, switchably applies an input voltage to an output inductor to develop an output voltage based on a PWM signal. The error amplifier generates a compensation voltage based on an output voltage feedback signal compared with a reference voltage. The PWM logic generates the PWM signal based on the compensation voltage and a ramp signal ranging between minimum and maximum ramp voltages. The startup circuit includes a reference circuit and a comparator. The reference circuit generates the reference voltage to vary in a linear manner relative to the output voltage between the minimum ramp voltage if the output voltage is zero and the maximum ramp voltage if the output voltage is at the same voltage as the input voltage. The comparator compares the compensation voltage with the reference voltage and provides the enable signal.

A method of starting a DC—DC converter into a pre-charged output voltage according to an embodiment of the present invention includes generating a reference voltage having a linear relationship with the output voltage, where the reference voltage ranges between a minimum and maximum voltage level of a PWM triangular waveform as the output voltage ranges between zero and an input voltage level, and enabling output switching of the DC—DC converter when the reference voltage is approximately equal to a compensation signal generated by an error amplifier comparing the reference voltage with a feedback signal representative of the output voltage.

The method of generating a reference voltage may include applying a first current based on the input voltage through first and second resistors coupled together at a first node to develop the minimum and maximum voltage levels of the PWM triangular waveform, applying the first current in one direction through a third resistor having a first end coupled to the first node and having a second end that develops the reference voltage, and applying a second current based on the output voltage through the third resistor in the opposite direction.

The method of generating a reference voltage may alternatively include coupling a first resistor between the input voltage and a first node, coupling a second, equal-valued resistor between the output voltage and a second node, coupling the current path of a first transistor between the first node and a third node, coupling the current path of a second transistor between the second node and the third node, maintaining the voltage of the third node at the minimum voltage level of the PWM triangular waveform, applying a control signal to the first transistor to maintain voltage of the first node at the maximum voltage level of the PWM triangular waveform, wherein the current path of the first transistor develops a first resistance, and applying the control signal to the second transistor such that its current path maintains a resistance between the second and third nodes that is equivalent to the first resistance.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Newer methodologies, such as presented in the related disclosure entitled "STARTUP CIRCUIT FOR A DC—DC CONVERTER", Ser. No. 10/775,560, reduce startup surge currents by activating the output drive of the regulator when the first driver pulse is detected, or when the compensation pin "COMP" reaches a fixed level, typically equivalent to a duty cycle (D) of about 10%. Surge currents are caused by the average voltage across the output inductor being non-zero. Any startup methodology which activates the output drive at a fixed COMP voltage (which is equivalent to a fixed duty cycle) has zero startup surge currents only when the duty cycle at driver activation coincidentally produces a voltage (VBAR) that is equal to the present output pre-biased voltage VOUT. The simplified equation governing VBAR is VBAR=D*VIN, where an asterisk "*" denotes multiplication, "D" is the duty cycle, and VIN is the input voltage. Given the unpredictable nature of pre-charged output levels, the probability of VBAR equaling VOUT is low in most applications particularly at startup.

Figure 1:
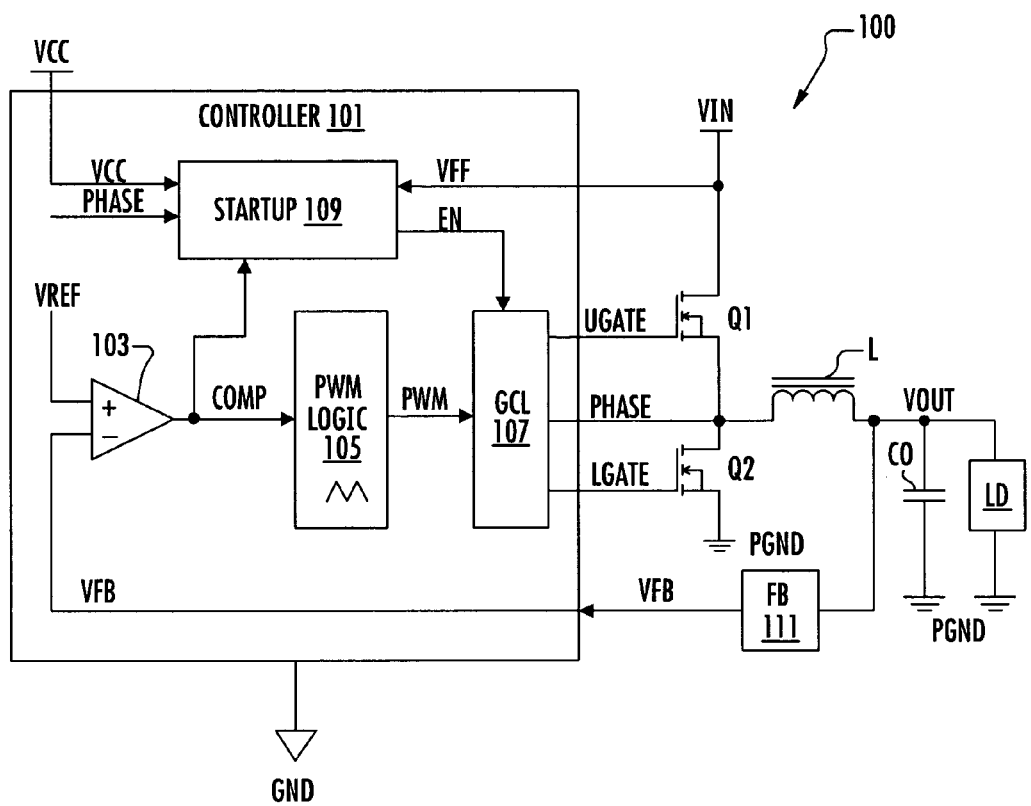
FIG. 1 is a simplified schematic and block diagram of a DC—DC converter including a startup circuit implemented according to an exemplary embodiment of the present invention.

FIG. 1 is a simplified schematic and block diagram of a DC—DC converter 100 including a startup circuit 109 implemented according to an exemplary embodiment of the present invention. The DC—DC converter 100 is shown as a buck-type converter for purposes of illustration, although it is understood that the present invention is equally applicable to other types of power converters. A pair of switches Q1 and Q2 are coupled in series between respective terminals of an input source voltage, shown as VIN and power ground (PGND). In the embodiment shown, the switches Q1 and Q2 are implemented as N-channel metal-oxide semiconductor, field-effect transistors (MOSFETs), although other types of electronic switches are contemplated including semiconductor switches suitable for integrated circuit (IC) fabrication. The upper switch Q1 has its drain coupled to VIN, its gate receiving an upper gate control signal UGATE, and its source coupled to the drain of the lower switch Q2 at a phase node PHASE developing a PHASE signal. A node and the signal it develops are referred to herein with the same name unless otherwise specified. The lower switch Q2 has its drain coupled to PHASE, receives a lower gate control signal LGATE at its gate and has its source coupled to PGND. The PHASE node is coupled through an output inductor L to an output node that develops an output signal VOUT. The VOUT signal is applied to a load LD and an output capacitor CO both referenced to ground. The VOUT signal is fed back through a feedback (FB) circuit 111 as a feedback voltage signal VFB to a controller 101, which outputs the UGATE and LGATE signals to control operation of the switches Q1 and Q2. The PHASE node is also typically provided to the controller 101 for various purposes, including overcurrent detection.

The controller 101 includes an error amplifier 103, PWM logic 105, gate control logic (GCL) 107 and the startup circuit 109. In typical configurations, the error amplifier 103 senses VOUT via the VFB signal or a voltage sense signal (not shown) or other means, and generates a compensation signal COMP provided at its output to the PWM logic 105. As shown, VFB is provided to the inverting input of the error amplifier 103 within the controller 101, although alternative methods are contemplated for sensing the output. The PWM logic 105 includes an oscillator or the like (not shown) which generates a reference oscillation waveform (e.g., PWM triangular waveform signal) and a PWM comparator (not shown) which compares the reference waveform with the COMP signal to generate a PWM signal provided to the GCL 107. Based on the PWM signal, the GCL 107 asserts the UGATE signal high to turn on the switch Q1 and asserts the LGATE signal low to turn off the switch Q2 to couple VIN through the output inductor L to drive the voltage level of VOUT. The GCL 107 then asserts the UGATE signal low and the LGATE signal high to turn off Q1 and to turn on Q2. Operation toggles in this manner based on the duty cycle of the PWM signal.

A typical startup sequence is to ramp the VREF signal provided to the non-inverting input of the error amplifier 103 from zero to a set point voltage level. If VOUT is already pre-charged, such as by the load LD or by other DC—DC converters (e.g., redundant converters or the like), then the VFB signal is already high and the error amplifier 103 pulls COMP low. The PWM logic 105 responds by producing the PWM signal at a relatively low duty cycle causing the GCL 107 to activate the lower switch Q2 for a substantial period of time in an attempt to reduce VOUT. Thus, the switch Q2 is coupled between ground and the pre-charged VOUT signal through the inductor L for a sufficiently long enough period of time, potentially exceeding its thermal limit. In general, if the average voltage across the inductor L is not zero, surge currents are generated which potentially causes damage to the DC-DC converter 100 (e.g., the switch Q2) or to components in the load LD.

The startup circuit 109 is provided to prevent this undesirable situation. The startup circuit 109 provides an enable signal EN to the GCL 107 to effectively enable and disable output switching. The controller 101 receives power via a VCC signal referenced to a common power supply terminal or signal ground (GND), where the VCC signal is provided to the startup circuit 109. The controller 101 includes a Voltage Feed Forward (VFF) pin internally coupled to the startup circuit 109, where VFF is externally coupled to the VIN signal. The PHASE signal and the COMP signal are provided to the startup circuit 109, which monitors operation of the error amplifier 103 via the COMP signal to determine when it is appropriate to assert the EN signal to enable output switching in order to reduce or otherwise eliminate undesired surge currents.

The GCL 107 includes a pair of output drivers (not shown) that drive the gates of the switches Q1 and Q2 based on the PWM signal as known to those skilled in the art. Also, the GCL 107 typically includes shoot-through protection logic or the like that ensures that only one of the switches Q1 and Q2 is on at any given time. When the EN signal is asserted high, the GCL 107 operates as normal and when the EN signal is asserted low, the GCL 107 turns both of the switches Q1 and Q2 off to disable output switching. In one embodiment, for example, the GCL 107 disables both of the output drivers so that the UGATE and LGATE signals are both asserted low and remain low while the EN signal is asserted low. Internal and external embodiments of the GCL 107 are contemplated. An external gate drive IC, for example, may be configured with an enable input that receives the EN signal or a version thereof. In some embodiments, the GCL 107 tri-states its outputs in response to the EN signal going low, and a separate driver IC (not shown) incorporating the switches Q1 and Q2 detects the tri-state condition and disables itself. The present invention is not limited to any specific embodiment or configuration of the GCL 107 or the switching devices.

The startup circuit 109 implemented according to an embodiment of the present invention provides for a method to startup with minimal surge currents by beginning driver switching at a duty cycle where the average voltage across the output inductor L is sufficiently close to zero. Such startup methodology allows reduced surge currents in the output inductor L and reduced non-monotinicities in the output voltage VOUT. By using the VFF signal having a voltage that is equal to or otherwise representative of the input voltage VIN, and the PHASE signal having a voltage representative of the output pre-biased voltage, a reference voltage VREF is created with respect to the oscillator peak-to-peak (P2P) waveform, that approximates the duty cycle necessary to achieve an average voltage across of the output inductor L of nearly 0V. By activating the drivers of the DC—DC converter 100 when the COMP voltage reaches this reference level, the surge current in the output inductor L is minimized during a pre-biased startup condition.

In other words, by enabling the output drive of a buck regulator only after its COMP pin has reached a duty cycle that produces a voltage "VBAR" which is substantially equal to VOUT, a system according to an embodiment of the present invention causes the average voltage across the inductor L to be close to 0V thereby minimizing any system startup surge currents and/or non-monotinicities during startup. Such system and method minimizes any potential for any damage to the system from the above-described startup irregularities.

In a switching regulator, the duty cycle determines the output voltage through the simplified equation of VOUT=D*VIN. Parasitic losses in the system add terms to this equation, but are considered negligible for the purpose of this description. The duty cycle of the regulator is set in a voltage mode regulator by the intersection of the voltage at the COMP pin, with an oscillator ramp waveform, described herein as a triangular waveform. When the COMP pin voltage is above the ramp maximum (VMAX), then the regulator operates at D=1 (or 100% duty cycle). Conversely, when the COMP pin voltage is below the ramp minimum (VMIN), then the regulator operates at D=0 (or 0% duty cycle). When the voltage of COMP is anywhere between VMAX and VMIN, then the regulator produces a duty cycle between D=0 and D=1. For output voltages greater than 0V and less than VIN, a D/COMP voltage can be found which satisfies the simplified equation above. The startup circuit 109 performs this analog calculation prior to the initiation of regulator switching.

Figure 2:
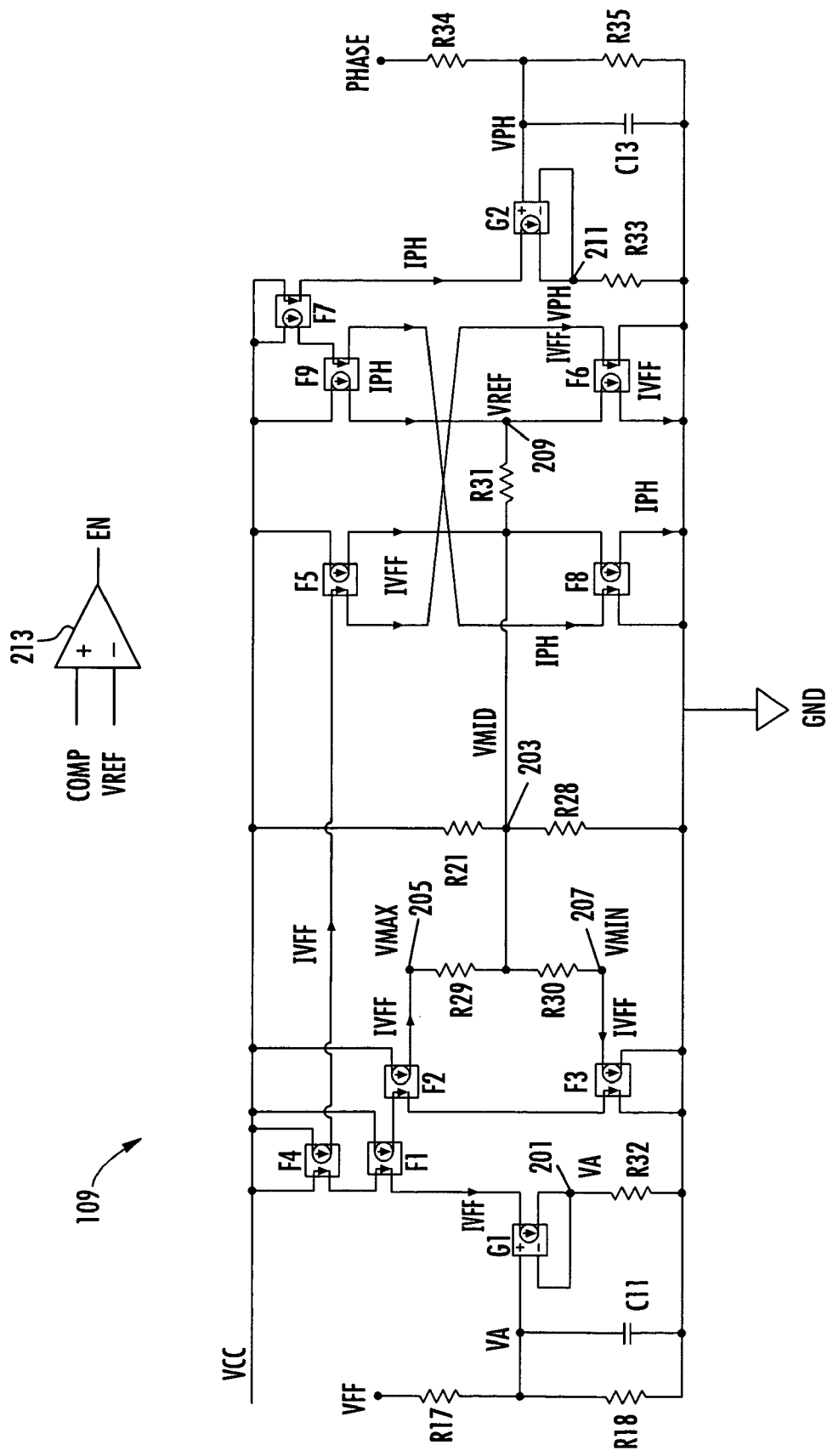
FIG. 2 is a more detailed schematic diagram of the startup circuit of FIG. 1 implemented according to an exemplary embodiment of the present invention.

FIG. 2 is a more detailed schematic diagram of the startup circuit 109 implemented according to an exemplary embodiment of the present invention. The VFF signal is divided by resistors R17 and R18 to a voltage VA relative to GND and filtered by capacitor C11. The VA signal is provided to the non-inverting input of a transconductance amplifier G1, which has a current drive output with a current output terminal coupled to the inverting input of G1 at a node 201. The current drive terminals of the transconductance amplifier G1 is coupled in series with current input paths of a pair of unity current mirrors F1 and F4. The amplifier G1 operates to drive node 201 to the same voltage level VA, which is applied across a resistor R32 coupled to ground. In this manner, the amplifier G1 develops a current IVFF=VA/R32, which is applied to both inputs of the unity current mirrors F1 and F4. The current mirror F1 has a current drive output that drives IVFF into the current input paths of another pair of unity current mirrors F2 and F3, which drive the same current IVFF at their outputs.

The current drive output of the current mirror F2 is coupled in series with a resistor R29 between VCC and a node 203 at an intermediate node 205. Thus, the current mirror F2 drives current IVFF through R29 to develop the VMAX voltage level at node 205 representing the maximum voltage level of the PWM triangular waveform or oscillator ramp. The current drive output of the current mirror F3 is coupled in series with a resistor R30 to GND between the node 203 and GND at an intermediate node 207. Thus, the current mirror F3 drives the current IVFF through R30 developing the VMIN voltage level at node 207 representing the minimum voltage level of the oscillator ramp. A pair of voltage divider resistors R21 and R28 are coupled together in series between VCC and ground with an intermediate junction coupled to the node 203. The node 203 develops a voltage VMID being the center voltage of the oscillator ramp between VMIN and VMAX. In a particular embodiment, the resistors R21 and R28 are equal and relatively small valued resistors (e.g., 5KΩ) relative to the resistors R29 and R30 (e.g. 60KΩ), so that VMID is set to about ½ VCC. Thus, VMAX=VMID+IVFF*R29 and VMIN=VMID−IVFF*R30.

The current drive output of the current mirror F4 drives the current IVFF through the current input paths of unity current mirrors F5 and F6. The current drive output of current mirror F5 is coupled between VCC and the node 203 and the current drive output of current mirror F6 is coupled between a node 209 and GND. A resistor R31 is coupled between nodes 203 and 209, where node 209 develops the VREF signal. Thus, the current mirror F5 drives IVFF into node 203 at one end of R31 and the current mirror F6 pulls the same current level IVFF from node 209 at the other end of R31.

The voltage of the PHASE signal is divided by resistors R34 and R35 to a voltage VPH relative to GND and filtered by capacitor C13. The VPH signal is provided to the non-inverting input of a transconductance amplifier G2, which has a current drive output with a current output terminal coupled to the inverting input of G1 and to a node 211. The amplifier G1 operates to drive node 211 to the same voltage level VPH, which is applied across a resistor R33 coupled to GND. In this manner, the amplifier G2 develops a current IPH=VPH/R33, which is applied to the current input path of a unity current mirror F7. The current mirror F7 has a current drive output that drives the current IPH into the current input paths of another pair of unity current mirrors F9 and F8, which drive the same current IPH at their outputs. The output of current mirror F9 drives IPH into node 209 at one end of the resistor R31 and the current mirror F8 pulls the same current level IPH from the node 203 at the other end of R31.

The resistor dividers R17/R18 and R34/R35 divide VFF and PHASE, respectively, by the same amount. In the embodiment illustrated, both are configured to divide by 7 so that VA=⅐ VFF and VPH=⅐ PHASE (e.g., R17=R34=198KΩ and R18=R35=33KΩ). The resistors R29, R30, R31 and R32 are equal in value and twice the value of R33 (e.g., R29=R30=R31=R32=2*R33, and in a more specific embodiment, the resistors R29–R32 are each 60KΩ and R33 is 30KΩ). It is noted that if the voltage of PHASE equals the voltage of VFF, then the current IPH is twice the current level of IVFF to drive VREF to VMAX, as further described below.

The VREF signal is provided to the inverting input of a comparator 213, which receives the COMP signal at its other input and which drives the EN signal at its output. In this manner, VREF is compared with the voltage at the COMP pin, such that when the COMP pin equals VREF the converter 100 is switching at a duty cycle that closely approximates VOUT (ignoring parasitic losses that potentially inhibit exact matching). In this manner, two external pieces of information, VIN and VOUT are used for this calculation, which voltages can be readily determined from several sources. In the case of the converter 100, this is done using the VFF pin to provide VIN information, as the feed forward block uses this information for oscillator ramp determination. Alternatively, the high side output current (HSOC) pin can be used to measure the input voltage if the current source is disabled until the EN driver enable signal is asserted. Holding off the HSOC current source is desirable as it adds a negative offset to the VIN voltage as part of its HSOC functionality.

The voltage of the PHASE node at startup and prior to the initiation of switching has a DC short to VOUT through the output inductor L, and therefore can be used to provide VOUT information. In the converter 100, the center of the oscillator ramp VMID is set to ½ VCC, and the voltage at the VFF pin sets VMAX and VMIN of the ramp through the use of current sources and unit (e.g., same-valued) resistors. By using the same current sources and unit resistors, and a current source derived from phase with 2× the gain as those derived from VFF the reference voltage can be created.

In the above case should PHASE be equal to 0V, then VPH is 0V and the current mirror sources F7, F8 and F9 are turned off and the voltage at VREF=VMID−R31*IVFF=VMID−R39*IVFF=VMIN (e.g., VREF=VMIN). If VOUT is equal to VFF, then twice as much current is pulled through the unit resistor R33, canceling out VFF and adding back an equal amount thereby causing VREF=VMID−R31*IVFF+IPH*R31=VMID+IVFF*R31=VMAX (e.g., VREF=VMAX). In this manner, VREF has a linear relationship with VOUT and linearly ranges between VMIN and VMAX while VOUT ranges between 0 and VIN (e.g., VREF=VMIN for VOUT=0, VREF=VMAX for VOUT=VIN, and VREF=VMID for VOUT=VIN/2).

Should VOUT be greater than VFF, VREF is greater than VMAX, which in the case of the converter 100 is limited by an internal body diode of the high side switch Q1 to VFF+0.7V. The COMP pin is grounded prior to startup, and as the output of COMP is released and the non-inverting input of the error amplifier 103 is raised, COMP begins to rise as the non-inverting input exceeds the voltage at the inverting input. Eventually the COMP pin crosses VREF, indicating that it is at the optimal duty cycle to achieve zero average voltage across the output inductor L. At this time the EN signal is asserted to enable the drivers of the GCL 107 to begin driving the switches Q1 and Q2.

Figure 3:
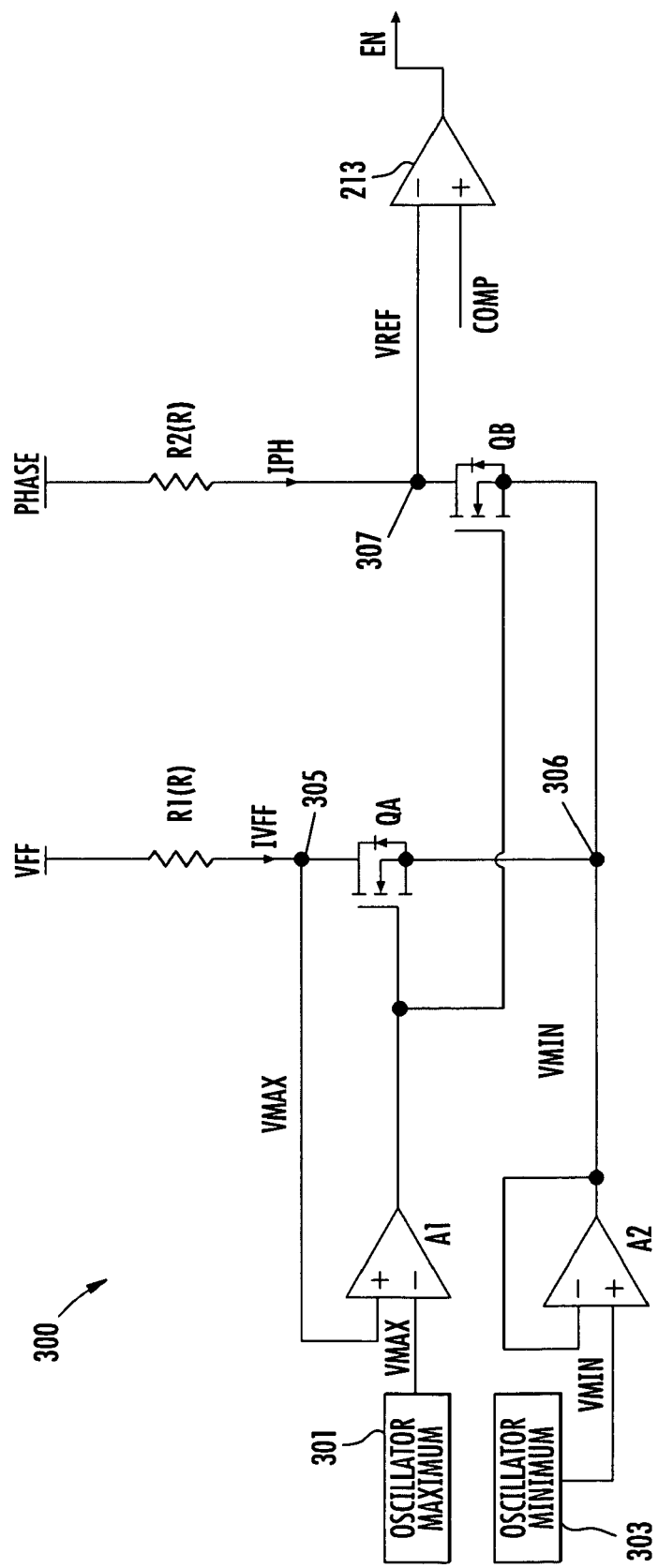
FIG. 3 is a simplified block and schematic diagram of another startup circuit implemented according to an alternative embodiment of the present invention.

FIG. 3 is a simplified block and schematic diagram of another startup circuit 300 implemented according to an alternative embodiment of the present invention. First and second blocks 301 and 303 generate the minimum and maximum voltages VMIN and VMAX, respectively, of the PWM triangular waveform. These voltages may be based on VCC in a similar manner described above. VMAX is provided to the inverting input of a first buffer/amplifier A1 and VMIN is provided to the non-inverting input of another buffer/amplifier A2. The output of the buffer/amplifier A1 is coupled to the gate of a FET QA, having its drain coupled to a node 305, which is coupled to the non-inverting input of the buffer/amplifier A1 and to one end of a unit resistor R1. The other end of the resistor R1 is coupled to VFF. The source of QA is coupled to a node 306, which is coupled to the output of the buffer/amplifier A2. The output of the buffer/amplifier A1 is coupled to the gate of another FET QB, ha+ving its source coupled to node 306 and its drain coupled to a node 307, which develops the VREF signal. Node 307 is coupled to one end of another unit resistor R2 and to the inverting input of the comparator 213, which receives the COMP signal at its inverting input and which generates the EN signal at its output. The other end of R2 is coupled to PHASE. The resistors R1 and R2 are equal having the same resistance R.

In operation, the buffer/amplifier A1 controls FET QA to maintain the node 305 at VMAX and the buffer/amplifier A2 maintains node 306 at VMIN. A current IVFF flows through R1 establishing a certain drain-source resistance of FET QA. Since the VGS for QA and QB is the same, QB is controlled with the same drain-source resistance as FET QA. In this manner, the resistor R2 and the FET QB divide the voltage of the PHASE node by a proportionate amount relative to VFF (divided by R1 and QA) to develop the voltage of VREF at node 307, which receives a current IPH flowing through R2. Note that if the voltage of PHASE is equal to VFF, that VREF=VMAX. It is intended that when PHASE is 0, that VREF drops to VMIN, but due to offset voltages of the FET QB, this is not exactly the case. Thus, the startup circuit 300 exhibits some non-linearities as PHASE tends towards zero.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A startup circuit for a DC—DC power converter, the power converter including an error amplifier which provides a compensation signal to a pulse width modulation (PWM) circuit that uses the compensation signal and a triangular PWM waveform to develop a PWM signal to control a switching circuit which converts an input voltage to an output voltage relative to a common power reference voltage, the switching circuit including an enable input, said startup circuit comprising:

a first circuit that establishes a minimum peak voltage and a maximum peak voltage for the triangular PWM waveform;

a second circuit that establishes a reference voltage having a linear relationship with the output voltage, wherein said reference voltage ranges from said minimum to maximum peak voltages while the output voltage ranges from the common power reference voltage to the level of the input voltage; and a comparator having a first input for receiving the compensation signal, a second input receiving said reference voltage, and an output providing an enable signal which is for providing to the enable input of the switching circuit.

2. The startup circuit of claim 1, wherein said second circuit comprises:

a bias circuit that provides a bias node;

a reference resistor having a first end coupled to said bias node and a second end coupled to a reference node that develops said reference voltage;

a first current generator that develops a first current proportional to the input voltage;

a second current generator that develops a second current proportional to the output voltage;

a first current mirror circuit, coupled to said first current generator, that applies said first current through said reference resistor from said bias node to said reference node; and a second current mirror circuit, coupled to said second current generator, that applies said second current through said reference resistor from said reference node to said bias node;

wherein said first and second current generators and said reference resistor are configured such that said reference voltage is approximately equal to said minimum peak voltage if the output voltage is at the common power reference voltage and is approximately equal to said maximum peak voltage if the output voltage is at the level of the input voltage.

3. The startup circuit of claim 2, the DC—DC power converter including an output inductor coupled between an output node that develops the output voltage and to an intermediate phase node of the switching circuit, wherein said second current generator senses the output voltage via the phase node.

4. The startup circuit of claim 2, further comprising:
a first resistor having approximately the same resistance as said reference resistor and having a first end coupled to said bias node and a second end;
a second resistor having approximately the same resistance as said reference resistor and having a first end coupled to said bias node and a second end; and
a third current mirror circuit, coupled to said first current generator, that applies said first current into said second end of said first resistor and that draws said first current from said second end of said second resistor;
wherein said second end of said first resistor develops said maximum peak voltage and said second end of said second resistor develops said minimum peak voltage.

5. The startup circuit of claim 4, wherein said second current generator is configured to generate said second current at twice the current level of said first current if the output voltage is approximately equal to the input voltage.

6. The startup circuit of claim 4, further comprising:
a first voltage divider for dividing the input voltage and providing an input sense voltage;
a second voltage divider for dividing the output voltage and providing an output sense voltage;
said first current generator comprising a first transconductance amplifier having an input receiving said input sense voltage and an output that generates said first current across a third resistor to maintain its voltage at approximately the same voltage level as said input sense voltage;
said second current generator comprising a second transconductance amplifier having an input receiving said output sense voltage and an output that generates said second current across a fourth resistor to maintain its voltage at approximately the same voltage level as said output sense voltage; and
wherein said third resistor has approximately twice the resistance of said fourth resistor.

7. The startup circuit of claim 1, wherein said second circuit comprises:
a first resistor having a first end for receiving the input voltage and a second end;
a second resistor having a first end for receiving the output voltage, a second end that develops said reference voltage, and a resistance approximately equal to said first resistor;
a first amplifier having an inverting input receiving said maximum peak voltage, a non-inverting input coupled to said second end of said first resistor and an output;
a buffer amplifier that maintains its output at said minimum peak voltage;
a first current device having a current path coupled between said second end of said first resistor and said output of said buffer amplifier and having a control input coupled to said output of said first amplifier; and
a second current device, configured substantially similar to said first current device, having a current path coupled between said second end of said second resistor and said output of said buffer amplifier and having a control input coupled to said output of said first amplifier;
wherein said first amplifier controls said first current device to maintain voltage at said second end of said first resistor approximately equal to said maximum peak voltage.

8. A DC—DC converter, comprising:
an output switching circuit, having an enable input for receiving an enable signal, that, when enabled, switchably applies an input voltage to an output inductor to develop an output voltage based on a PWM signal;
an error amplifier that generates a compensation voltage based on an output voltage feedback signal compared with a reference voltage;
PWM logic that generates said PWM signal based on said compensation voltage and a ramp signal ranging between minimum and maximum ramp voltages; and
a startup circuit, comprising:
a reference circuit that generates said reference voltage to vary in a linear manner relative to said output voltage between said minimum ramp voltage if said output voltage is zero and said maximum ramp voltage if said output voltage is at the same voltage as said input voltage; and
a comparator that compares said compensation voltage with said reference voltage and that provides said enable signal.

9. The DC—DC converter of claim 8, wherein said reference circuit comprises:
a bias circuit that provides a bias node;
a reference resistor having a first end coupled to said bias node and a second end coupled to a reference node that develops said reference voltage;
a first transconductance amplifier circuit that provides a first current based on said input voltage;
a second transconductance amplifier circuit that provides a second current based on said output voltage;
a first current mirror that asserts said first current through first and second resistors coupled to said bias circuit to develop said minimum and maximum ramp voltages;
a second current mirror that asserts said first current through said reference resistor in one direction; and
a third current mirror that asserts said second current through said reference resistor in the opposite direction.

10. The of claim 9, wherein said output voltage is sensed via said output inductor at startup.

11. The DC—DC converter of claim 9, wherein said second transconductance amplifier circuit is configured to generate said second current at twice the current level of said first current when said output voltage is approximately equal to said input voltage.

12. The DC—DC converter of claim 11, wherein said first transconductance amplifier circuit includes a first transconductance amplifier that maintains a voltage representative of said input voltage across a third resistor, wherein said second transconductance amplifier circuit includes a second transconductance amplifier that maintains a voltage representative of said output voltage across a fourth resistor, and wherein said third resistor is twice the resistance of said fourth resistor.

13. The DC—DC converter of claim 9, wherein said startup circuit is implemented on an integrated circuit receiving a supply voltage and wherein said bias circuit divides said supply voltage to provide said bias node.

14. The DC—DC converter of claim 8, wherein said reference circuit comprises:
- a first resistor having a first end coupled to sense said input voltage and a second end;
- a second resistor having a first end coupled to said output voltage, a second end that develops said reference voltage, and a resistance approximately equal to said first resistor;
- a first amplifier having an inverting input receiving said maximum ramp voltage, a non-inverting input coupled to said second end of said first resistor and an output;
- a buffer amplifier that maintains its output at said minimum ramp voltage;
- a first transistor having a current path coupled between said second end of said first resistor and said output of said buffer amplifier and having a control input coupled to said output of said first amplifier; and
- a second transistor, equivalent to said first transistor, having a current path coupled between said second end of said second resistor and said output of said buffer amplifier and having a control input coupled to said output of said first amplifier;
- wherein said first amplifier controls said first transistor to maintain voltage at said second end of said first resistor approximately equal to said maximum ramp voltage.

15. The DC—DC converter of claim 14, wherein said second resistor is coupled to sense said output voltage at a phase node coupled to said output inductor.

16. A method of starting a DC—DC converter into a precharged output voltage, comprising:
- generating a reference voltage having a linear relationship with the output voltage, wherein the reference voltage ranges between a minimum and maximum voltage level of a PWM triangular waveform as the output voltage ranges between zero and an input voltage level; and
- enabling output switching of the DC—DC converter when the reference voltage is approximately equal to a compensation signal generated by an error amplifier comparing the reference voltage with a feedback signal representative of the output voltage.

17. The method of claim 16, wherein said generating a reference voltage comprises:
- applying a first current based on the input voltage through first and second resistors coupled together at a first node to develop the minimum and maximum voltage levels of the PWM triangular waveform;
- applying the first current in one direction through a third resistor having a first end coupled to the first node and having a second end that develops the reference voltage; and
- applying a second current based on the output voltage through the third resistor in the opposite direction.

18. The method of claim 16, wherein said generating a reference voltage comprises:
- coupling a first resistor between the input voltage and a first node;
- coupling a second, equal-valued resistor between the output voltage and a second node;
- coupling the current path of a first transistor between the first node and a third node;
- coupling the current path of a second transistor between the second node and the third node;
- maintaining the voltage of the third node at the minimum voltage level of the PWM triangular waveform;
- applying a control signal to the first transistor to maintain voltage of the first node at the maximum voltage level of the PWM triangular waveform, wherein the current path of the first transistor develops a first resistance; and
- applying the control signal to the second transistor such that its current path maintains a resistance between the second and third nodes that is equivalent to the first resistance.

* * * * *